(12) United States Patent
Takamatsu et al.

(10) Patent No.: US 10,744,897 B2
(45) Date of Patent: Aug. 18, 2020

(54) POWER-SUPPLY APPARATUS

(71) Applicant: TOYOTA JIDOSHA KABUSHIKI KAISHA, Toyota, Aichi-ken (JP)

(72) Inventors: Naoyoshi Takamatsu, Sunto-gun (JP); Yoshihiko Hiroe, Toyota (JP); Yoshitaka Niimi, Susono (JP); Masaki Okamura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 196 days.

(21) Appl. No.: 16/106,511

(22) Filed: Aug. 21, 2018

(65) Prior Publication Data

US 2019/0084438 A1 Mar. 21, 2019

(30) Foreign Application Priority Data

Sep. 15, 2017 (JP) .................................. 2017-178361

(51) Int. Cl.
| | |
|---|---|
| *B60L 58/19* | (2019.01) |
| *H02J 7/00* | (2006.01) |
| *B60L 15/02* | (2006.01) |
| *B60W 10/08* | (2006.01) |
| *B60L 58/21* | (2019.01) |

(52) U.S. Cl.
CPC ............. *B60L 58/19* (2019.02); *B60L 15/025* (2013.01); *B60L 58/21* (2019.02); *B60W 10/08* (2013.01); *H02J 7/0024* (2013.01)

(58) Field of Classification Search
CPC ........ B60L 58/19; B60L 58/21; B60L 15/025; B60L 15/02; B60W 10/08; H02J 7/0024; H02J 7/00
See application file for complete search history.

(56) References Cited

U.S. PATENT DOCUMENTS

| | | | |
|---|---|---|---|
| 7,701,156 B2 | 4/2010 | Okamura | |
| 8,928,174 B2 | 1/2015 | Muto et al. | |

FOREIGN PATENT DOCUMENTS

| | | |
|---|---|---|
| JP | 2000-184604 A | 6/2000 |
| JP | 2007-325351 A | 12/2007 |
| JP | 4466126 B2 | 5/2010 |
| JP | 2010-239709 A | 10/2010 |

*Primary Examiner* — Robert L Deberadinis
(74) *Attorney, Agent, or Firm* — Sughrue Mion, PLLC (57) ABSTRACT

A power-supply apparatus includes: an energy storage unit including energy storage modules; switches conducting or shutting off a current and switching a connection state of the storage modules; a voltage control unit switching a voltage of the energy storage unit; drive units, connected to the energy storage unit in series, driving respective external rotating electrical machines; and a capacitor connected to the drive units. Further, the power-supply apparatus includes a control unit that, when the voltage control unit switches the voltages of the energy storage unit, supplies electric power regenerated in the drive units to the capacitor and discharges the capacitor, and after an absolute value of a voltage difference between a post-switching voltage of the energy storage unit and a voltage of the capacitor is less than a predetermined value, controls so that the post-switching voltage of the energy storage unit is applied to the capacitor.

4 Claims, 8 Drawing Sheets

POWER-SUPPLY APPARATUS

CROSS-REFERENCE TO RELATED APPLICATION(S)

The present application claims priority to and incorporates by reference the entire contents of Japanese Patent Application No. 2017-178361 filed in Japan on Sep. 15, 2017.

BACKGROUND

The present disclosure relates to a power-supply apparatus.

In the related art, a power-supply apparatus provided with a plurality of energy storage modules is known. For example, Japanese Laid-open Patent Publication No. 2010-239709 A discloses a power-supply apparatus that switches, by a plurality of switches, connection states of a plurality of batteries between a serial connection state and a parallel connection state. By switching the connection states of the plurality of batteries in this manner, it becomes possible to change a voltage of the power-supply apparatus to a desired voltage.

The power-supply apparatus disclosed in Japanese Laid-open Patent Publication No. 2010-239709 A can be used, for example, in an electronic circuit that supplies electric power to a rotating electrical machine (motor generator) of a vehicle through an inverter. In the electronic circuit that supplies electric power to the rotating electrical machine, a capacitor is connected in parallel to the power-supply apparatus in order to smooth an electric power transmitted between energy storage modules and the inverter. In the power-supply apparatus, the switches change the connection states of the energy storage modules and change a voltage in a staircase pattern. However, when the connection states of the plurality of energy storage modules in the power-supply apparatus are switched, due to a rapid change of an output voltage from the power-supply apparatus at the time of switching, a voltage difference with the capacitor and cause a flow may be generated and thus an inrush current flows. Therefore, a trouble may occur in the elements or the switches in the power-supply apparatus or the inverter.

The present disclosure has been made in view of the problems. There is a need for a power-supply apparatus which includes a plurality of energy storage modules and can switch an output voltage in a staircase pattern and supply an electric power to a rotating electrical machine of a vehicle, and suppress troubles in elements or switches of a power-supply apparatus where capacitors are connected in parallel.

SUMMARY

There is a need for at least partially solving the problems in the related art technology.

According to an embodiment of the present disclosure, a power-supply apparatus includes: an energy storage unit including a plurality of energy storage modules; a plurality of switches, connected to any of the plurality of energy storage modules, conducting or shutting off a current and to switch a connection state of the plurality of energy storage modules from one of a serial connection, a parallel connection, and a serial/parallel connection to another one of the serial connection, the parallel connection, and the serial/parallel connection; a voltage control unit switching a voltage of the energy storage unit by controlling the plurality of switches to switch between a current conduction state and a current shut-off state; drive units, each of the drive units being connected to the energy storage unit in series, driving respective external rotating electrical machines with an electric power supplied from the energy storage unit; and a capacitor connected to each of the drive units in parallel. Further, the power-supply apparatus includes a control unit that, when the voltage control unit switches the voltages of the energy storage unit, supplies electric power regenerated in the drive units to the capacitor when a voltage of the energy storage unit is increased and discharges the capacitor when the voltage of the energy storage unit is decreased, and after an absolute value of a voltage difference between a post-switching voltage of the energy storage unit and a voltage of the capacitor is less than a predetermined value, the control unit controls so that the post-switching voltage of the energy storage unit is to be applied to the capacitor.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, an embodiment of the present disclosure will be described with reference to the accompanied drawings. It should be noted that the same reference numerals are used to describe the same or corresponding parts in all the drawings relating to the following embodiment. Furthermore, the present disclosure is not specifically limited to the following embodiment.

Figure 1:
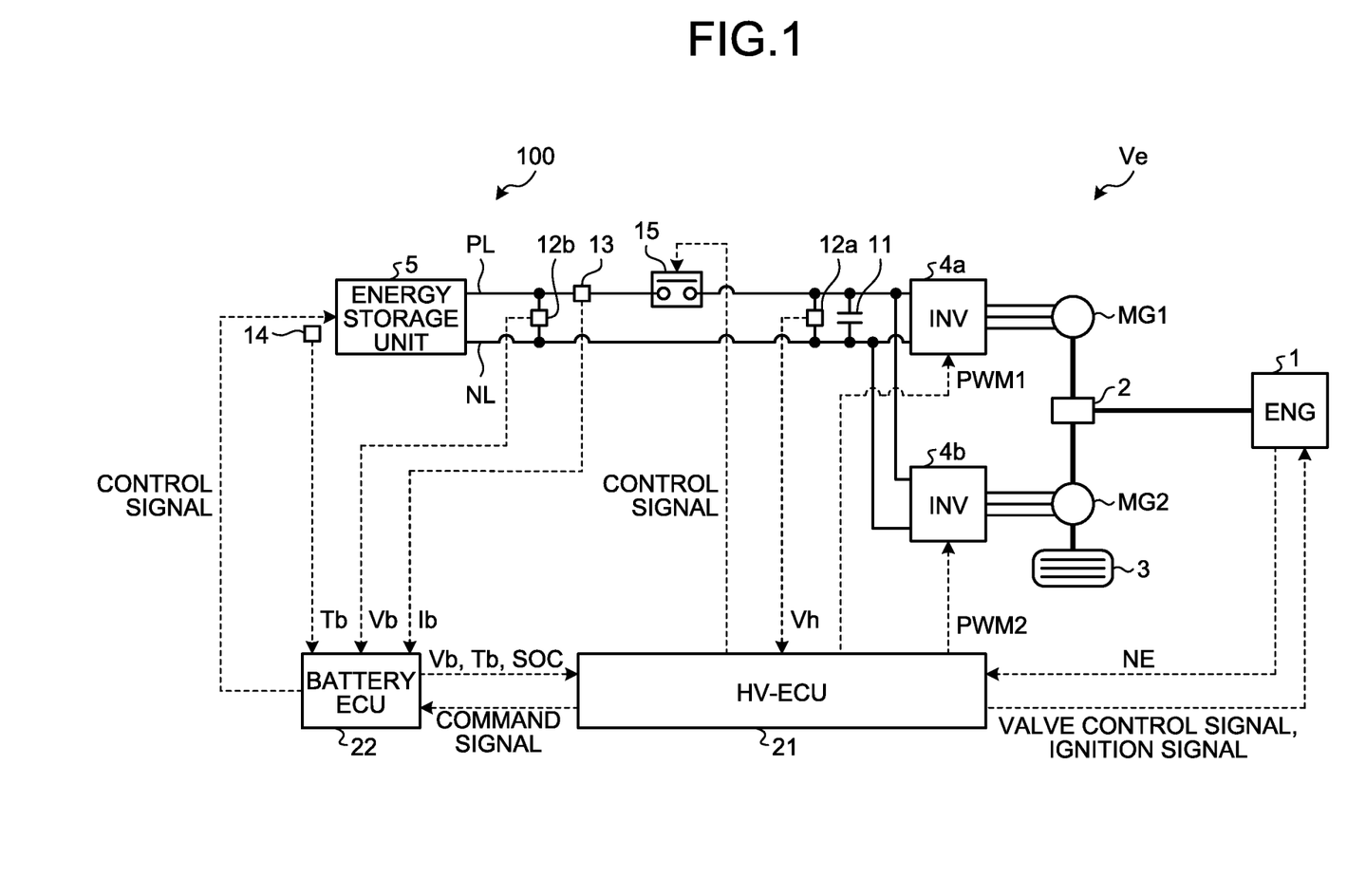
FIG. 1 is a drawing schematically illustrating a configuration of a vehicle equipped with a power-supply apparatus according to an embodiment of the present disclosure.

First, a power-supply apparatus according to an embodiment of the present disclosure will be described. FIG. 1 is a diagram schematically illustrating a configuration of a vehicle equipped with the power-supply apparatus according to this embodiment.

As illustrated in FIG. 1, a vehicle Ve is a Hybrid Vehicle (HV) drivable in a hybrid driving mode or an Electronic Vehicle (EV) driving mode and includes a power-supply apparatus 100. The vehicle Ve includes an engine (ENG) 1 as an internal combustion engine, a power split mechanism 2, a drive wheel 3, motor generators MG1 and MG2, inverters (INV) 4a and 4b, and an energy storage unit 5. As electronic circuits for exchanging electric power between the motor generators MG1 and MG2, the inverters 4a and 4b, and the energy storage unit 5, the vehicle Ve also includes a capacitor 11, voltage sensors 12a and 12b, a current sensor 13, a temperature sensor 14, a shut-off switch 15, a Hybrid Vehicle-Electronic Control Unit (HV-ECU) 21, and a battery Electronic Control Unit (ECU) 22. The power-supply apparatus 100 according to this embodiment includes at least the energy storage unit 5, the capacitor 11, the current sensor 13, the shut-off switch 15, and the battery ECU 22.

The engine 1 is a known engine such as a gasoline engine or a diesel engine. Each of the motor generators MG1, MG2 serving as rotating electrical machines functions as both an electric motor and a generator. The power split mechanism 2 is, for example, a planetary gear mechanism including three elements: a sun gear, a planetary carrier, and a ring gear. The engine 1 and the motor generators MG1, MG2 are connected to any one of those three elements, respectively.

In driving the vehicle Ve, the power split mechanism 2, for example, splits a drive force output from the engine 1 into two to distribute a half of the drive force to the motor generator MG1 and the other half to the motor generator MG2. The drive force distributed to the motor generator MG1 is used for power generation of the motor generator MG1. The drive force distributed to the motor generator MG2 is combined with drive force output from the motor generator MG2 and is output to the drive wheel 3.

The inverters 4a and 4b serving as drive units have a function of converting direct-current power into alternating-current power and vice versa and are configured to drive the motor generators MG1 and MG2. The inverters 4a and 4b are connected to the energy storage unit 5 through a positive line PL and a negative line NL. The shut-off switch 15 serving as a shut-off switch provided on the positive line PL electrically connects or shuts off the line between the energy storage unit 5 and the inverters 4a, 4b. The inverter 4a, for example, converts alternating-current power generated by the motor generator MG1 into direct-current power and supplies the power to the energy storage unit 5. The inverter 4b, for example, converts direct-current power supplied from the energy storage unit 5 into alternating-current power and supplies the power to the motor generator MG2 so as to generate drive force.

Figure 2:
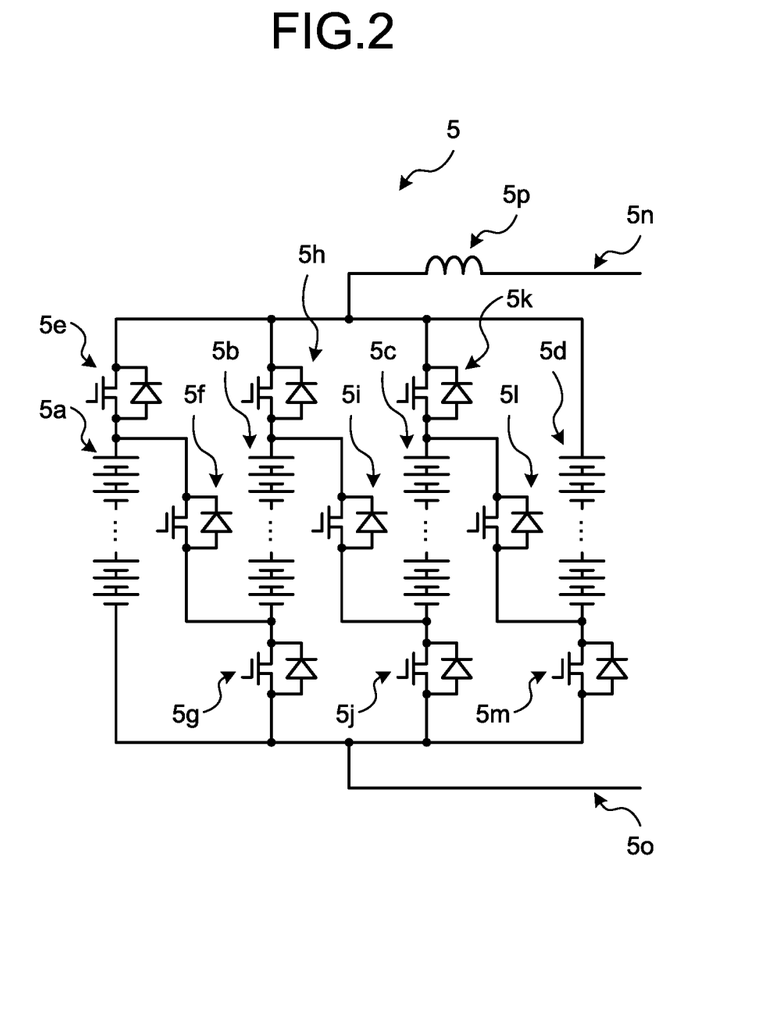
FIG. 2 is a circuit diagram illustrating an example configuration of an energy storage unit according to an embodiment of the present disclosure.

The energy storage unit 5, serving as an energy storage unit, discharges electric power to the inverters 4a and 4b through the positive line PL and the negative line NL or charges electric power supplied from the inverters 4a and 4b. FIG. 2 is a circuit diagram illustrating an example configuration of the energy storage unit 5 according to this embodiment.

As illustrated in FIG. 2, the energy storage unit 5 according to this embodiment includes a plurality of energy storage modules, a plurality of switch elements, a positive electrode input/output unit 5n, a negative electrode input/output unit 5o, and a coil 5p. Specifically, in this embodiment, the plurality of energy storage modules may be, for example, four energy storage modules 5a, 5b, 5c, and 5d, and the plurality of switch elements may be, for example, nine switch elements 5e, 5f, 5g, 5h, 5i, 5j, 5k, 5l, and 5m.

A plurality of secondary batteries is connected in series to each of the energy storage modules 5a to 5d. The secondary batteries may be, for example, lithium ion batteries and nickel hydrogen batteries. As a component of the energy storage modules 5a to 5d, capacitors may be used in place of the secondary batteries. In regard to each of the energy storage modules 5a to 5d, a positive electrode is electrically connected to the common positive electrode input/output unit 5n, and a negative electrode is electrically connected to the common negative electrode input/output unit 5o.

Each of the switch elements 5e to 5m, serving as switches, may be a semiconductor switch element such as a transistor and a diode. When control signals are supplied from the outside to the switch elements 5e to 5m, on/off states are switched between a current conduction state (on-state) and a current shut-off state (off-state). Relay elements may be used as the switches.

The switch elements 5e to 5m are electrically connected to any one of the energy storage modules 5a to 5d. Specifically, the switch elements 5e, 5h, and 5k are electrically connected to the positive electrodes of the energy storage modules 5a, 5b, and 5c, respectively and to the positive electrode input/output unit 5n. The switch elements 5g, 5j and 5m are electrically connected to the negative electrodes of the energy storage modules 5b, 5c and 5d, respectively and to the negative electrode input/output unit 5o. The switch element 5f is electrically connected to a wire between the positive electrode of the energy storage module 5a and the switch element 5e and to a wire between the negative electrode of the energy storage module 5b and the switch element 5g. The switch element 5i is electrically connected to a wire between the positive electrode of the energy storage module 5b and the switch element 5h and to a wire between the negative electrode of the energy storage module 5c and the switch element 5j. The switch element 5l is electrically connected to a wire between the positive electrode of the energy storage module 5c and the switch element 5k and to a wire between the negative electrode of the storage module 5d and the switch element 5m. In addition, the coil 5p is electrically connected to the positive electrode of each of the energy storage modules 5a, 5b, 5c, and 5d and to the positive electrode input/output unit 5n.

Figure 3A:
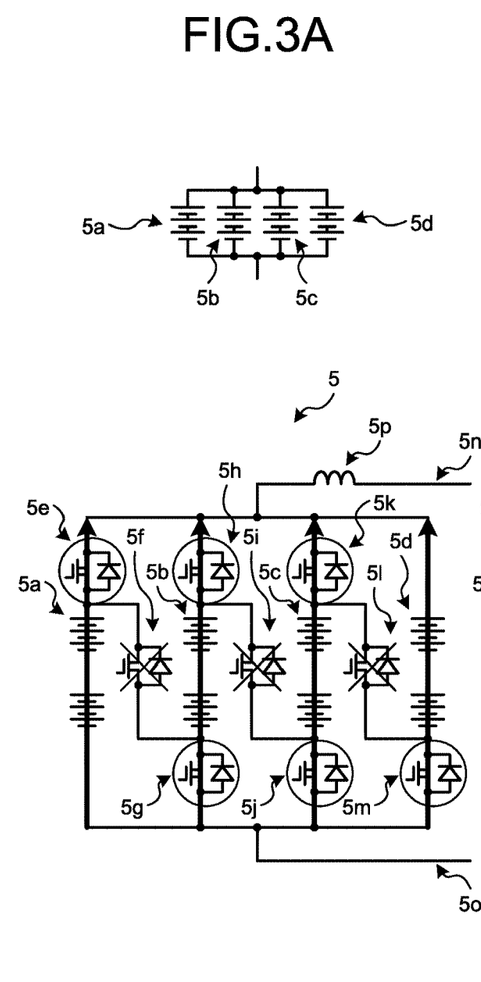
FIGS. 3A to 3C are views illustrating example relationships between connection states of energy storage modules and on/off states of switch elements.
Figure 3B:
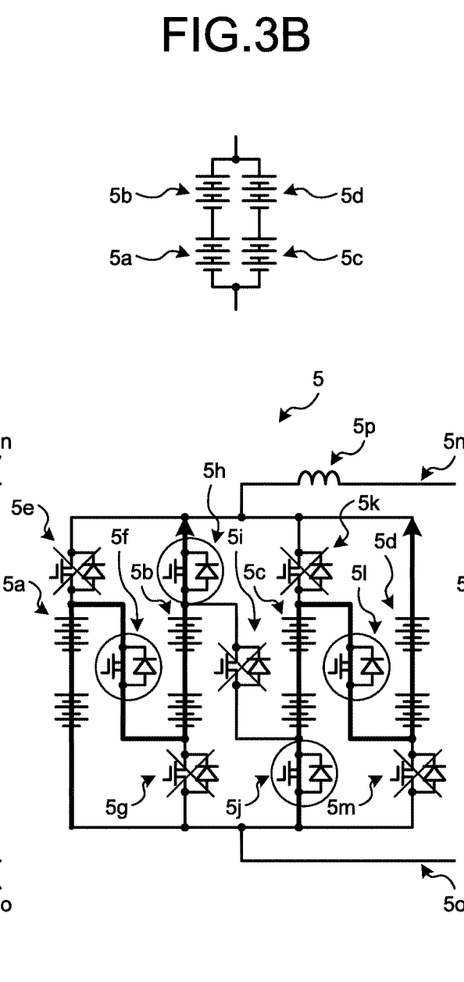
Figure 3C:
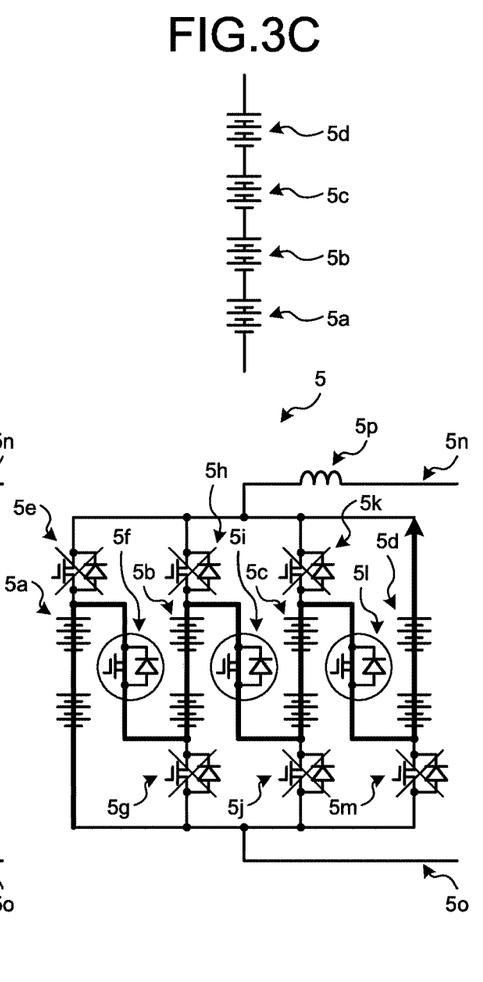

In the energy storage modules 5a to 5d, the on/off states of the switch elements 5e to 5m are switched so that the connection state is switched from any one of a serial connection, a parallel connection, and a serial/parallel connection to another connection state of those connections. FIG. 3 is a view illustrating example relationships between the connection states of the energy storage modules 5a to 5d and the on/off states of the switch elements 5e to 5m according to this embodiment.

Specifically, for example, as illustrated in FIG. 3A, the switch elements 5e, 5g, 5h, 5j, 5k and 5m, which are surrounded by circles, are in the on-state and the switch elements 5f, 5i, and 5l, which are marked by "x" are in the off-state. Accordingly, the energy storage modules 5a to 5d are all connected in parallel, that is, in what is called a parallel connection state, leading to flows of currents as indicated by four thick arrows at the time of discharge. Furthermore, as illustrated in FIG. 3B, the switch elements 5f, 5h, 5j, and 5l are in the on-state and the switch elements 5e, 5g, 5i, 5k, and 5m are in the off-state. Accordingly, in the connection states of the energy storage modules 5a to 5d, the energy storage module 5a and the energy storage module 5b are connected in series, the energy storage module 5c and the energy storage module 5d are connected in series, and the energy storage modules 5a, 5b and the energy storage modules 5c, 5d are connected in parallel, that is, in what is called a serial/parallel connection state, leading to flows of currents as indicated by two thick arrows at the time of discharge. Still further, as illustrated in FIG. 3C, the switch elements 5f, 5i and 5l are in the on-state, and the switch elements 5e, 5g, 5h, 5j, 5k and 5m are in the off-state so that the energy storage modules 5a to 5d are all connected in series, that is, in what is called a serial connection state, leading to a current flow as indicated by one thick arrow at the time of discharge. Voltages Vb of the energy storage unit 5 in the connection states in FIGS. 3A, 3B, and 3C are herein given as Vb1, Vb2, and Vb3, respectively.

Referring back to FIG. 1, the capacitor 11 is connected to the energy storage unit 5 by the positive line PL and the negative line NL. The capacitor 11 smooths the electric power flowing between the energy storage unit 5 and the inverters 4a, 4b. The voltage sensor 12a is connected to the positive line PL and the negative line NL to detect a voltage Vh applied to the capacitor 11 and supply the voltage Vh to the HV-ECU 21.

The current sensor 13 is provided on the positive line PL to detect a current value Ib of the electric power discharged or charged by the energy storage unit 5 and output the current value Ib to the battery ECU 22. The voltage sensor 12b is connected to the positive line PL and the negative line NL to detect the voltage Vb of the energy storage unit 5 and output the voltage Vb to the battery ECU 22. The temperature sensor 14 is provided near the energy storage unit 5, being configured to detect a temperature value Tb of the energy storage unit 5 and output the temperature value Tb to the battery ECU 22.

Each of the HV-ECU 21 and the battery ECU 22 is physically an electronic circuit that mainly includes a well-known microcomputer including a Central Processing Unit (CPU), a Random-Access Memory (RAM), a Read Only Memory (ROM), and an input/output interface. Each function of the HV-ECU 21 and the battery ECU 22 as described above is performed by loading an application program held in the ROM into the RAM and executing the application program by the CPU so as to operate one or more objects to be controlled under control of the CPU and to read and write data to and from the RAM or ROM.

The HV-ECU 21 and the battery ECU 22 can communicate with each other so as to transmit and receive signals indicating, for example, various commands and detection results of various sensors. The HV-ECU 21 primarily controls the engine 1 and the motor generators MG1, MG2 and controls the voltage Vb of the energy storage unit 5 to generate vehicle drive force in accordance with a driver's request when the vehicle Ve is driven. The signals indicating, for example, the number of rotations NE of the engine 1, the number of rotations of the motor generators MG1 and MG2, the vehicle speed, the accelerator position, the temperature value Tb, and the state of charge (SOC) of the energy storage unit 5 are input to the HV-ECU 21. The HV-ECU 21 outputs an electronic throttle valve control signal (valve control signal) and an ignition signal, with respect to the engine 1, which are calculated based on input information. and The HV-ECU 21 further outputs signals PWM1 and PWM2, which are pulse width modulation (PWM) control signals with respect to the inverters 4a and 4b. The HV-ECU 21 further outputs a command signal for switching the voltage Vb of the energy storage unit 5 to a required voltage. Herein, a required voltage with respect to the energy storage unit 5 is calculated in accordance with a load applied to the energy storage unit 5.

Figure 4:
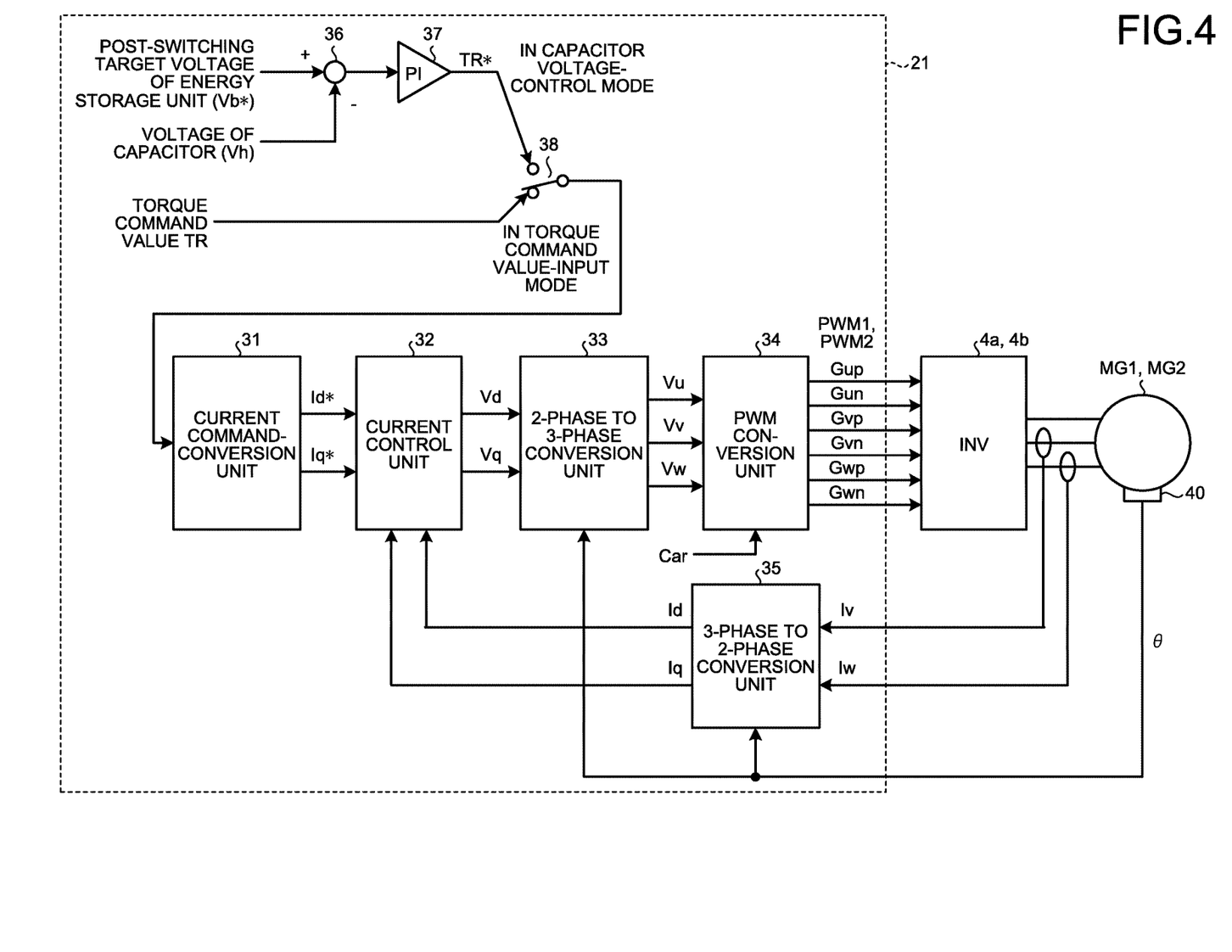
FIG. 4 is a block diagram illustrating a configuration of a Hybrid Vehicle Electronic Control Unit (HV-ECU) according to an embodiment of the present disclosure.

Hereinafter described is a configuration of the HV-ECU 21 serving as a control unit that drives the motor generators MG1 and MG2, particularly, a configuration to control operations of the inverters 4a and 4b. FIG. 4 is a block diagram illustrating a configuration of the HV-ECU 21 according to the embodiment.

As illustrated in FIG. 4, the HV-ECU 21 includes, as main parts, a current command-conversion unit 31, a current control unit 32, a 2-phase to 3-phase conversion unit 33, a pulse width modulation (PWM) conversion unit 34, and a 3-phase to 2-phase conversion unit 35. The HV-ECU 21 further includes a subtractor 36, a PI control unit 37, and a changing-over switch 38.

Based on torque command values TR of the motor generators MG1 and MG2 which are 3-phase alternating-current motors, or based on a predetermined command value TR*, the current command-conversion unit 31 generates a d-axis current command signal Id* and a q-axis current command signal Iq* as 2-phase current command signals. The current command-conversion unit 31 supplies the d-axis current command signal Id* and the q-axis current command signal Iq* to the current control unit 32.

The 3-phase to 2-phase conversion unit 35 receives from the inverters 4a and 4b at least two of a U-phase current Iu, a V-phase current Iv, and a W-phase current Iw as feedback information. Specifically, for example, the 3-phase to 2-phase conversion unit 35 receives the V-phase current Iv and the W-phase current Iw. In regard to the V-phase current Iv and the W-phase current Iw received from the inverters 4a and 4b, the 3-phase to 2-phase conversion unit 35 converts 3-phase into 2-phase using a rotation angle θ from a resolver 40 of the motor generators MG1 and MG2. That is, the V-phase current Iv and the W-phase current Iw corresponding to 3-phase current values are converted into a d-axis current Id and a q-axis current Iq corresponding to 2-phase current values. The 3-phase to 2-phase conversion unit 35 supplies the converted d-axis current Id and the q-axis current Iq to the current control unit 32.

Based on a difference between the d-axis current command signal Id* output from the current command-conversion unit 31 and the d-axis current Id output from the 3-phase to 2-phase conversion unit 35, the current control unit 32 generates a d-axis voltage command signal Vd corresponding to a 2-phase voltage command signal. Along with this d-axis voltage command signal Vd, based on a difference between the q-axis current command signal Iq* output from the current command-conversion unit 31 and the q-axis current Iq output from the 3-phase to 2-phase conversion unit 35, the current control unit 32 generates a q-axis voltage command signal Vq corresponding to a 2-phase voltage command signal. At this time, the current control unit 32 may generate the d-axis voltage command signal Vd and the q-axis voltage command signal Vq by utilizing, for example, proportional integral (PI) control or proportional integral derivative (PID) control. The current control unit 32 supplies the d-axis voltage command signal Vd and the q-axis voltage command signal Vq to the 2-phase to 3-phase conversion unit 33.

The 2-phase to 3-phase conversion unit 33 converts the supplied d-axis voltage command signal Vd and the q-axis voltage command signal Vq into 3-phase voltage command signals, that is a U-phase voltage command signal Vu, a V-phase voltage command signal Vv, and a W-phase voltage command signal Vw, by using the rotation angle θ from the resolver 40 of the motor generators MG1 and MG2. The 2-phase to 3-phase conversion unit 33 supplies the U-phase voltage command signal Vu, the V-phase voltage command signal Vv, and the W-phase voltage command signal Vw to the PWM conversion unit 34.

The PWM conversion unit 34 generates U-phase PWM signals Gup and Gun to drive p-type and n-type switching elements in the inverters 4a and 4b based on a magnitude relationship between a carrier signal Car having a predetermined carrier frequency f and the U-phase voltage command signal Vu. The PWM conversion unit 34 supplies the U-phase PWM signals Gup and Gun to the inverters 4a and 4b. Similarly, the PWM conversion unit 34 generates V-phase PWM signals Gvp and Gvn based on a magnitude relationship between the carrier signal Car and the V-phase voltage command signal Vv. Furthermore, the PWM conversion unit 34 generates W-phase PWM signals Gwp and Gwn based on a magnitude relationship between the carrier signal Car and the W-phase voltage command signal Vw. These U-phase PWM signals Gup and Gun, the V-phase PWM signals Gvp and Gvn, and the W-phase PWM signals Gwp and Gwn are supplied to the inverter 4a as the signals PWM1 and are also supplied to the inverter 4b as the signal PWM2.

The subtractor 36 calculates a potential difference (Vb*−Vh), that is, a difference between the voltage Vh of the capacitor 11 supplied from the voltage sensor 12a and a post-switching target voltage Vb* of the energy storage unit 5 when voltages are switched in the energy storage unit 5. The subtractor 36 supplies the calculated potential difference (Vb*−Vh) to the PI control unit 37.

The PI control unit 37 calculates the command value TR* using a PI (proportional-integral) gain with respect to the potential difference (Vb*−Vh) and outputs the command value TR* to the changing-over switch 38. Meanwhile, the torque command values TR are output from an external ECU to the changing-over switch 38. The changing-over switch 38 switches to select whether the torque command values TR of the motor generators MG1, MG2 or the predetermined command value TR* is to be supplied to the current command-conversion unit 31.

The battery ECU 22 serving as a voltage control unit mainly manages charge states of the energy storage unit 5, detects abnormality, and controls voltages. Various signals indicating, for example, the temperature value Tb, the voltage Vb, and the current value Ib are input to the battery ECU 22. The battery ECU 22 calculates the SOC of the energy storage unit 5 based on the temperature value Tb, the voltage Vb, and the current value Ib. The battery ECU 22 transmits the signals indicating the temperature value Tb, the SOC, and the like to the HV-ECU 21. The battery ECU 22 outputs a control signal for switching on/off states of the switch elements 5e to 5m of the energy storage unit 5 based on the command signal received from the HV-ECU 21. The on/off states of the switch elements 5e to 5m are switched by the control signal supplied from the battery ECU 22. Accordingly, the energy storage modules 5a to 5d are switched to the connection state in accordance with the required voltage.

Figure 5:
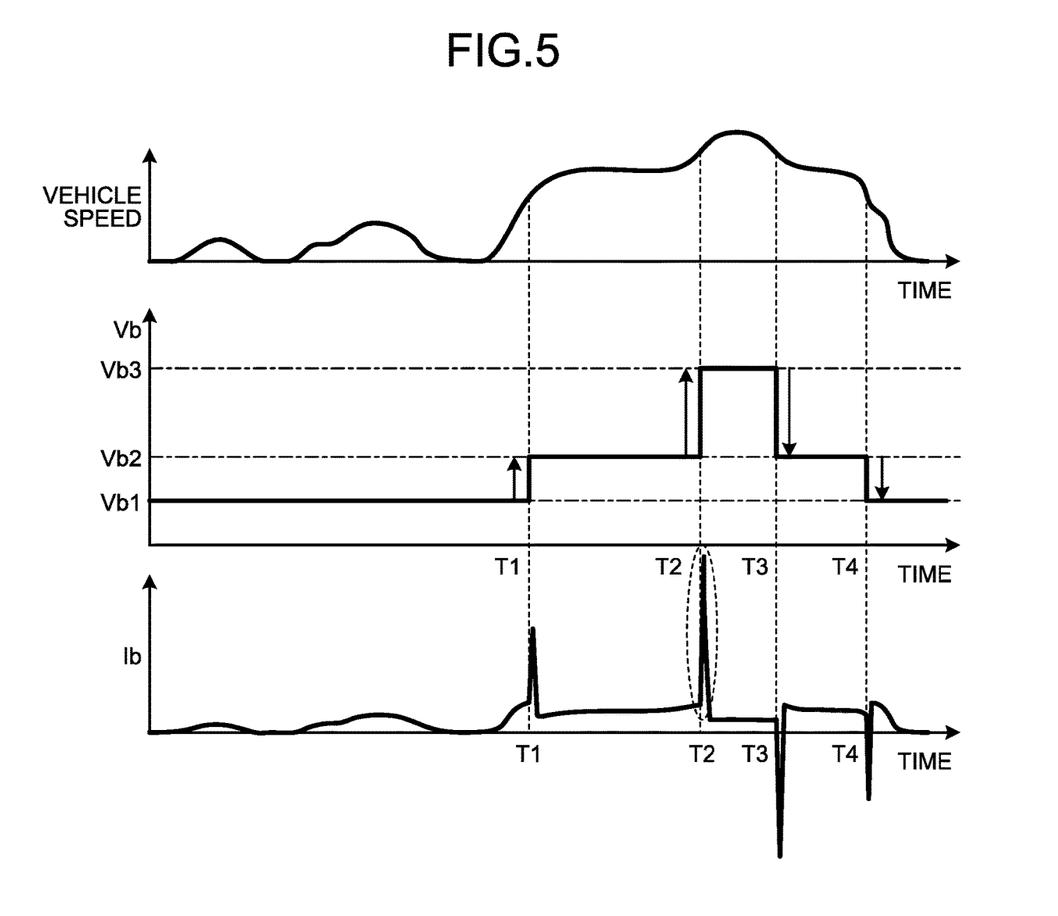
FIG. 5 is a graph illustrating an example relationship between vehicle speed and voltage values of the energy storage unit to explain a problem in the related art.
Figure 6:
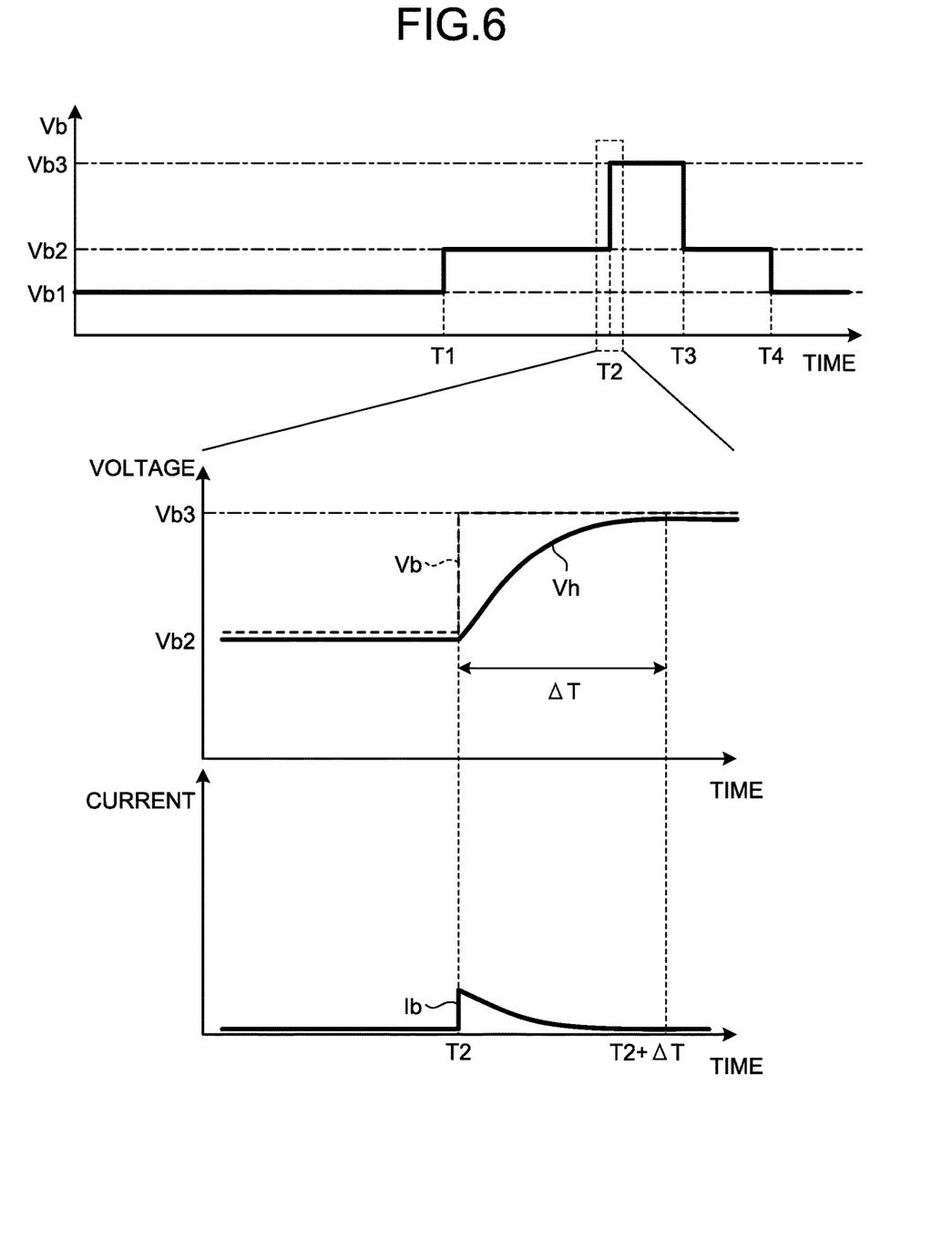
FIG. 6 is a graph illustrating an example of a change in voltage value of the energy storage unit in the related art, and a time variation of a voltage value and a corresponding current value in a region surrounded by a dotted line.

Hereinafter described is a problem that may occur when the voltages of energy storage unit 5 are switched in the power-supply apparatus 100. FIG. 5 is a graph illustrating an example of a relationship between the vehicle speed, voltage values, current values of the energy storage unit to explain a problem which may occur in the related art. FIG. 6 is a graph illustrating an example of a change in voltage value of the energy storage unit 5, and a time variation of a voltage value and a corresponding current value in a region surrounded by a dotted line. In the example illustrated in FIG. 5, at high vehicle speed and with a high load applied to the energy storage unit 5, the voltage Vb of the energy storage unit 5 becomes high which is in the connection state. In the following description, the shut-off switch 15 illustrated in FIG. 1 is maintained in the on-state.

As illustrated in FIG. 5, for example, in accordance with an increase in the vehicle speed of the vehicle Ve at the time T1, when the value of the voltage Vb is switched from Vb1 to Vb2 which is higher than Vb1, a surge inrush current may flow in a positive direction. Similarly, at the time T2, when the value of the voltage Vb is switched from Vb2 to Vb3 which is higher than Vb2, an inrush current may flow in the positive direction. Similarly, in accordance with a decrease in the vehicle speed of the vehicle Ve at the time T3 and the time T4, when the value of the voltage Vb is switched from Vb3 to Vb2 and from Vb2 to Vb1, respectively, an inrush current may flow in a negative direction. Herein, the positive direction refers to a direction in which current flows when the energy storage unit 5 is discharged, and the negative direction refers to a direction in which current flows when the energy storage unit 5 is charged. An inrush current is supposed to be caused by a potential difference between the energy storage unit 5 and the capacitor 11 illustrated in FIG. 1 when the voltage Vb of the energy storage unit 5 is switched to another voltage. If such an inrush current flows, a trouble may occur in the elements of the energy storage unit 5 or in the switches.

Japanese Laid-open Patent Publication No. 2005-253206 A proposes a method in which a resistor is provided between the energy storage unit 5 and the inverters 4a, 4b in series with respect to the energy storage unit 5. The resistor herein is insertable and detachable while the conduction state between the energy storage unit 5 and the inverters 4a, 4b is maintained. In this Patent Document, when a potential difference occurs between the energy storage unit 5 and the aforementioned capacitor 11, the above-described resistor is inserted so as to gently charge or discharge the capacitor 11. Specifically, for example, as illustrated in FIG. 6, a case is described where the value of the voltage Vb is switched from Vb2 to Vb3 at the time T2. In this case, at the time T2, the voltage Vb of the energy storage unit 5 increases from Vb2 to Vb3 in a staircase pattern, while the voltage Vh of the capacitor 11 gently increases from Vb2 to Vb3 in a predetermined time ΔT. Along with this increase, once the current value Ib measured by the current sensor 13 of the energy storage unit 5 increases, the current value Ib gently decreases in the predetermined time ΔT. That is, the method disclosed in Japanese Laid-open Patent Publication No. 2005-253206 A has a problem that it takes time to erase the potential difference between the energy storage unit 5 and the capacitor 11. Furthermore, when the resistor is connected to the energy storage unit 5 in series while driving the motor generators MG1 and MG2, a charge/discharge current of the energy storage unit 5 also flows into the resistor connected to the energy storage unit 5 so that there is a problem that the voltage Vh of the capacitor 11 may suddenly increase or decrease.

Therefore, the inventors of the present disclosure have intensively studied on a control method for quickly charging or discharging the capacitor 11 while preventing generation of an inrush current. As a result of the intensive studies, when the voltage Vb of the energy storage unit 5 is switched to another voltage, the present inventors have found a method for adjusting the voltage Vh of the capacitor 11, so that the voltage Vh approaches the post-switching voltage Vb of the energy storage unit 5. This method reduces a voltage difference between the energy storage unit 5 and the capacitor 11 so that even when the post-switching voltage Vb of the energy storage unit 5 is applied to the capacitor 11, an inrush current from the energy storage unit 5 to the capacitor 11 can be reduced.

Specifically, the inventors have found a method for applying the target voltage Vb* to the capacitor 11 by the energy storage unit 5 after the difference between the target voltage after switching the voltage Vb of the energy storage unit 5 to another voltage (target voltage Vb*) and the voltage Vh of the capacitor 11 becomes less than a predetermined value. As the method for adjusting the voltage Vh of the capacitor 11, when the voltage Vh is increased, it is preferable to supply electric power regenerated in the inverter 4a and 4b to the capacitor 11, and when the voltage Vh is decreased, it is preferable to discharge the capacitor 11 by the inverters 4a and 4b. Further, it is preferable that the adjustment of the voltage Vh of the capacitor 11 be performed after an electrical shutting off is done between the energy storage unit 5 and the inverters 4a and 4b. In this case, an electrical conduction between the energy storage unit 5 and the inverters 4a, 4b allows the energy storage unit 5 to apply the target voltage Vb* to the capacitor 11.

Figure 7:
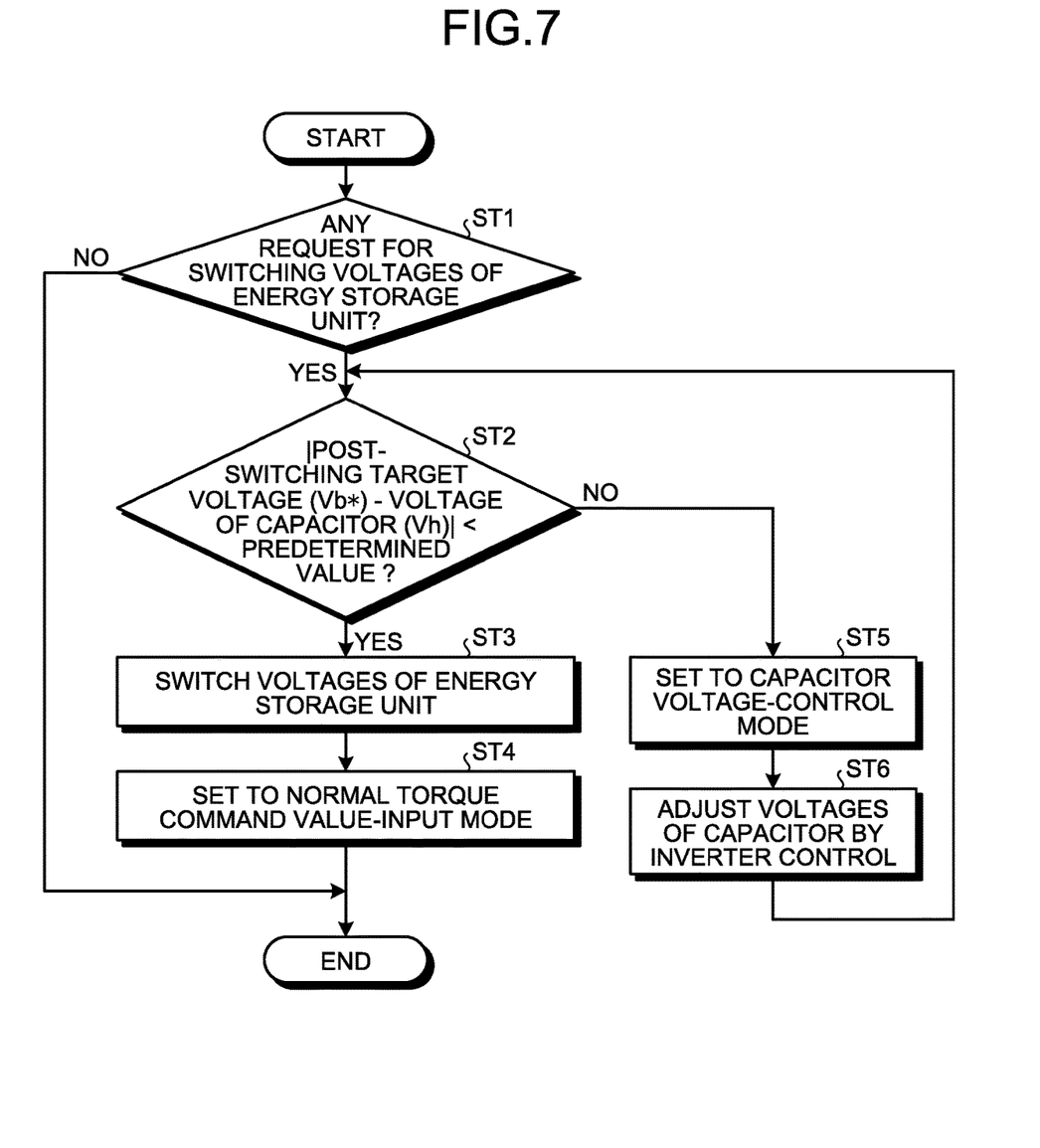
FIG. 7 is a flowchart illustrating a control method of the power-supply apparatus according to an embodiment of the present disclosure.

FIG. 7 is a flowchart illustrating a control method of the power-supply apparatus according to an embodiment of the present disclosure. The process in the flowchart of FIG. 7 is repeatedly carried out by the HV-ECU 21 while the motor generators MG1 and MG2 of the vehicle Ve are in operation.

As illustrated in FIG. 7, in the control method according to this embodiment, first, in step ST1, the HV-ECU 21 determines whether there is a request from the battery ECU 22 to the energy storage unit 5 for switching the voltage Vb to another voltage in accordance with an increase or a decrease of the vehicle speed of the vehicle Ve. Herein, it should be noted that the shut-off switch 15 illustrated in FIG. 1 is controlled by the HV-ECU 21 to be in the on-state, and the energy storage unit 5 and the inverters 4a, 4b are in the conduction state.

Hereinafter described is an example of a method of determining whether there is the request for switching the voltage Vb of the energy storage unit 5 to another voltage. That is, the battery ECU 22 determines candidate voltages of voltages VH of the system within a range from a minimum required voltage VHmin corresponding to an induced voltage of the motor generators MG1, MG2 to a maximum output voltage VHmax. Then, the battery ECU 22 estimates power losses in the energy storage unit 5, the inverters 4a and 4b, and the motor generators MG1 and MG2 at each of the candidate voltages and calculates the sum of the estimated power losses in the entire system. After the calculation, the battery ECU 22 sets a voltage command value VH# based on a candidate voltage of the aforementioned candidate voltages at which the sum of the estimated power losses becomes the minimum. The battery ECU 22 compares the voltage command value VH# set herein with the voltage Vb of the energy storage unit 5 measured by the voltage sensor 12b. When an absolute value of the voltage difference between the voltage command value VH# and the voltage Vb of the energy storage unit 5 is equal to or greater than the predetermined value, the battery ECU 22 supplies to the HV-ECU 21 a signal indicating a request for switching the voltage Vb of the energy storage unit 5 to another voltage. It should be noted that the method of determining whether there is the request for switching the voltage Vb of the energy storage unit 5 to another voltage is not limited to the above method, and various determination methods other than one described above may also be employed.

In step ST1, when the HV-ECU 21 determines that there is no request from the battery ECU 22 to switch the voltage Vb of the energy storage unit 5 to another voltage (No in step ST1), this control process is ended. On the other hand, when the HV-ECU 21 determines in step ST1 that there is a request from the battery ECU 22 to switch the voltage Vb of the energy storage unit 5 to another voltage (Yes in step ST1), the process proceeds to step ST2.

In step ST2, the HV-ECU 21 causes the subtractor 36 to calculate the absolute value of the potential difference (Vb*−Vh) between the post-switching target voltage Vb* of the energy storage unit 5 supplied from the battery ECU 22 and the voltage Vh of the capacitor 11 supplied from the voltage sensor 12a. Then, the HV-ECU 21 determines whether the absolute value of the potential difference (Vb*−Vh) is less than a predetermined value. That is, the HV-ECU 21 determines whether the following Formula (1) is satisfied.

$$|\text{Post-switching target voltage of energy storage unit }(Vb^*) - \text{voltage of capacitor }(Vh)| < \text{predetermined value} \quad (1)$$

Note that the predetermined value is a constant determined in advance in accordance with the capacitance of the capacitor 11 or characteristics of the inverters 4a, 4b and the energy storage unit 5. Further, it is preferable that the predetermined value be at least less than the absolute value of the voltage Vb in voltage change which is switched in a staircase pattern in the energy storage unit 5, specifically, the absolute value of a difference corresponding to one staircase ($|Vb2-Vb1|$, $|Vb3-Vb2|$), and it is more preferable that the predetermined value be less than a minimum absolute value in voltage change corresponding to one staircase.

In step ST2, when the HV-ECU 21 determines that the absolute value of the potential difference (Vb*−Vh) is less than the predetermined value (Yes in step ST2), the process proceeds to step ST3. In step ST3, the HV-ECU 21 switches the shut-off switch 15 to the on-state when the shut-off switch 15 is in the off-state, and maintains the on-state when the shut-off switch 15 is in the on-state. Simultaneously, the HV-ECU 21 supplies to the battery ECU 22 a command signal for switching the voltage Vb of the energy storage unit 5 to another voltage. Under the control of the battery ECU 22, the voltage Vb of the energy storage unit 5 is switched to the target voltage Vb*. Then, the process proceeds to step ST4.

In step ST4, the HV-ECU 21 sets the control to be in a normal torque command value-input mode. That is, the HV-ECU 21 switches the mode of the changing-over switch 38 illustrated in FIG. 4 to the torque command value-input mode. Accordingly, the torque command values TR with respect to the motor generators MG1 and MG2 are input to the current command-conversion unit 31 in the HV-ECU 21. In such a manner, the control process by the HV-ECU 21 is ended.

In step ST2, when the HV-ECU 21 determines that the absolute value of the potential difference (Vb*−Vh) is equal to or greater than the predetermined value (No in step ST2), the process proceeds to step ST5. In step ST5, the HV-ECU 21 sets the control to be in a capacitor voltage-control mode. That is, the HV-ECU 21 switches the mode of the changing-over switch 38 illustrated in FIG. 4 to the capacitor voltage-control mode. The command value TR* based on the potential difference (Vb*−Vh) between the target voltage Vb* of the energy storage unit 5 and the voltage Vh of the capacitor 11 is input to the current command-conversion unit 31 in the HV-ECU 21. In the meanwhile, the HV-ECU 21 controls the shut-off switch 15 illustrated in FIG. 1 to be in the off-state. Accordingly, the energy storage unit 5, the inverters 4a and 4b, and the capacitor 11 are electrically in the shut-off state. Then, the process proceeds to step ST6.

In step ST6, the HV-ECU 21 controls the inverters 4a and 4b so as to adjust the voltage Vh of the capacitor 11. That is, the HV-ECU 21 controls the inverters 4a and 4b to charge the capacitor 11 or discharge the capacitor 11. Specifically, when the following Formula (2-1) is satisfied, the capacitor 11 is charged so as to increase the voltage Vh of the capacitor 11.

$$\text{Post-switching target voltage of energy storage unit } (Vb^*)-\text{voltage of capacitor } (Vh) > 0 \qquad (2\text{-}1)$$

On the other hand, when the following Formula (2-2) is satisfied, the capacitor 11 is discharged so as to decrease the voltage Vh of the capacitor 11.

$$\text{Post-switching target voltage of energy storage unit } (Vb^*)-\text{voltage of capacitor } (Vh) < 0 \qquad (2\text{-}2)$$

After the adjustment of the voltage Vh of the capacitor 11 is done, the control process returns to step ST2. The aforementioned steps ST2, ST5 and ST6 are repeatedly carried out in order until the Formula (1) is satisfied in step ST2. After the Formula (1) is satisfied in step ST2, the HV-ECU 21 controls the shut-off switch 15 to be in the on-state, and processes in steps ST3 and ST4 are performed in order, whereby the control process by the HV-ECU 21 is ended.

Figure 8:
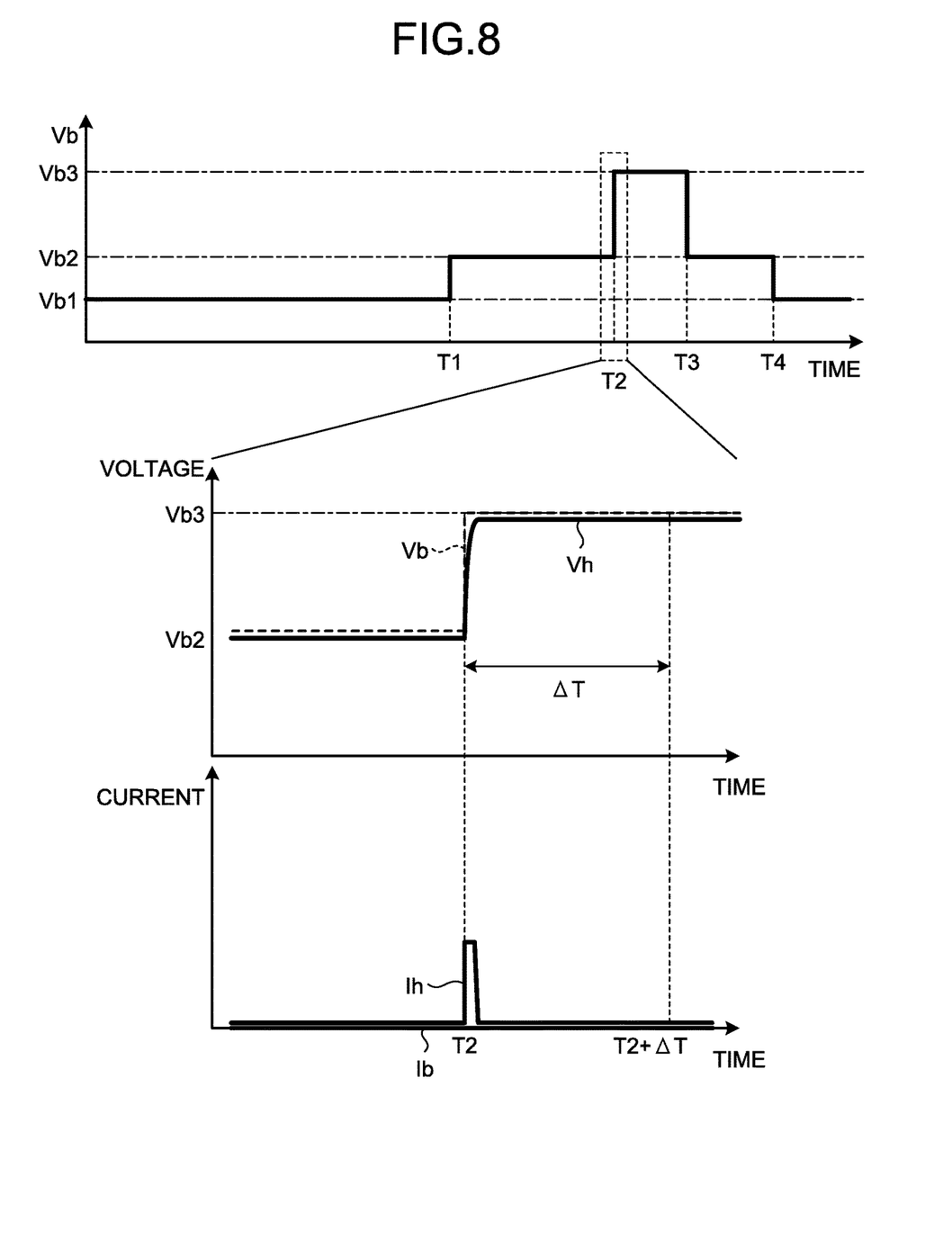
FIG. 8 is a graph illustrating an example of a change in voltage value of the energy storage unit, and a time variation of the voltage value and a corresponding current value in a region surrounded by a dotted line when a control method according to an embodiment of the present disclosure is carried out.

FIG. 8 is a graph illustrating an example of a change in voltage value of the energy storage unit 5 when the control method of the power-supply apparatus 100 according to an embodiment in the power-supply apparatus 100 is carried out, and a time variation of the voltage value and a corresponding current value in a region surrounded by a dotted line.

As with the case in FIG. 6, FIG. 8 illustrates a case where the voltage Vb is switched from Vb2 to Vb3 at the time T2. In this case, in the control method according to the embodiment, the target voltage Vb* of the energy storage unit 5 is set to Vb3, and the voltage Vh of the capacitor 11 immediately before switching the voltage Vb of the energy storage unit 5 is substantially set to Vb2. The predetermined value in Formula (1) is less than a voltage difference corresponding to one staircase switched in the energy storage unit 5 so that the absolute value of the potential difference (Vb*−Vh) between the target voltage Vb* (Vb3) of the energy storage unit 5 and the voltage Vh of the capacitor 11 is equal to or greater than the predetermined value. Therefore, when the voltage Vb of the energy storage unit 5 is switched to another voltage, the shut-off switch 15 is in the off-state so that the current value Ib from the energy storage unit 5 becomes 0 around the time T2. Meanwhile, immediately before the time T2 when the voltage Vb of the energy storage unit 5 switches to another voltage, a current Ih flows from the inverters 4a and 4b into the capacitor 11, in which the voltage Vh is adjusted by the inverters 4a and 4b, in a time shorter than the predetermined time ΔT required in the related art for a current flow. In this case, the magnitude of the current Ih can be controlled by the inverters 4a and 4b, which prevents an inflow of an excessive inrush current into the capacitor 11.

According to the embodiment of the present disclosure, when the voltage Vb of the energy storage unit 5 is switched to another voltage, the energy storage unit 5 and the capacitor 11 are electrically shut off so that the voltage Vh of the capacitor 11 is made substantially equal to the target voltage Vb* after switching the voltage Vh of the capacitor 11 by the inverters 4a and 4b connected to the motor generators MG1 and MG2, and then, the voltage Vb of the energy storage unit 5 is switched to the target voltage Vb*. Accordingly, due to driving power of the vehicle Ve, the voltage Vh of the capacitor 11 is adjustable to a voltage close to the target voltage Vb* in a short time period so that the voltage Vb of the energy storage unit 5 is switchable to another voltage at high speed and an inrush current is prevented from flowing into the capacitor 11. This makes it possible to prevent breakage of the elements and the switches in the power-supply apparatus 100.

Although an embodiment of the present disclosure has been specifically described, the present disclosure is not limited to the aforementioned embodiment and may be modified in various ways based on the technical idea of the present disclosure. For example, the numerical values aforementioned in the embodiment are merely examples, and different numerical values may be used as necessary.

In the embodiment as mentioned above, the HV-ECU 21 and the battery ECU 22 are described as separate control units but are not necessarily limited to different control units. That is, the functions of the HV-ECU 21 and the battery ECU 22 may be executed by an ECU, a control unit, or a control system.

Furthermore, the power-supply apparatus 100 according to the embodiment of the present disclosure is mountable on a vehicle of various types as long as the vehicle includes the energy storage unit 5. Specifically, the power-supply apparatus 100 is mountable on a Hybrid Vehicle (HV), a Plug-in Hybrid Vehicle (PHV), an Electric Vehicle without engine (EV), a Fuel Cell Vehicle (FCEV), and the like.

Still further, in the embodiment as mentioned above, two inverters 4a and 4b are provided in the power-supply apparatus 100, but three or more inverters for driving the motor generators MG1 and MG2 may be provided.

According to an embodiment, it becomes possible to supply electric power from a drive unit to the capacitor while electrically shutting off an energy storage unit and the drive unit so that a voltage of the capacitor can be quickly brought to a desired voltage.

According to an embodiment, it becomes possible to avoid an inflow of an inrush current from the energy storage unit to the capacitor so that an excessive inrush current is better prevented from flowing into the capacitor.

According to the power-supply apparatus of the present disclosure, when voltages of an energy storage unit are switched, it is capable of reducing an absolute value of a voltage difference between a post-switching voltage of the energy storage unit and a voltage of a capacitor connected to a drive unit in parallel, and it is capable of suppressing generation of an excessive inrush current and capable of suppressing troubles with elements or switches in the power-supply apparatus provided with a plurality of energy storage modules, being capable of switching output voltages in a staircase pattern and supplying electric power to a rotating electrical machine of a vehicle, in which capacitors are connected in parallel.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power-supply apparatus comprising:
   an energy storage unit including a plurality of energy storage modules;

a plurality of switches, connected to any of the plurality of energy storage modules, configured to conduct or shut off a current and to switch a connection state of the plurality of energy storage modules from one of a serial connection, a parallel connection, and a serial/parallel connection to another one of the serial connection, the parallel connection, and the serial/parallel connection;

a voltage control unit configured to switch a voltage of the energy storage unit by controlling the plurality of switches to switch between a current conduction state and a current shut-off state;

drive units, each of the drive units being connected to the energy storage unit in series, configured to drive respective external rotating electrical machines with an electric power supplied from the energy storage unit; and a capacitor connected to each of the drive units in parallel, wherein the power-supply apparatus includes a control unit that configured to, when the voltage control unit switches the voltages of the energy storage unit, supply electric power regenerated in the drive units to the capacitor when a voltage of the energy storage unit is increased and discharges the capacitor when the voltage of the energy storage unit is decreased, and after an absolute value of a voltage difference between a post-switching voltage of the energy storage unit and a voltage of the capacitor is less than a predetermined value, the control unit is configured to control so that the post-switching voltage of the energy storage unit is to be applied to the capacitor.

2. The power-supply apparatus according to claim 1, further comprising a shut-off switch, provided between the energy storage unit and the drive units, configured to switch from an electrical connection state to a shut-off state and vice versa between the energy storage unit and the drive units under control of the control unit, wherein, when the control unit controls the shut-off switch to be in the off-state and electrically shuts off the energy storage unit and the drive units, the control unit is configured to supply electric power regenerated in the drive units to the capacitor or discharges the capacitor.

3. The power-supply apparatus according to claim 1, wherein the predetermined value is less than a minimum absolute value in voltage change of the energy storage unit when the voltage of the energy storage unit increases or decreases.

4. The power-supply apparatus according to claim 2, wherein the predetermined value is less than a minimum absolute value in voltage change of the energy storage unit when the voltage of the energy storage unit increases or decreases.

* * * * *